(12) United States Patent
Perlin et al.

(10) Patent No.: US 11,635,627 B2
(45) Date of Patent: Apr. 25, 2023

(54) HEAD MOUNTED DISPLAY AND METHOD

(71) Applicants: Kenneth Perlin, New York, NY (US); Fengyuan Zhu, New York, NY (US)

(72) Inventors: Kenneth Perlin, New York, NY (US); Fengyuan Zhu, New York, NY (US)

(*) Notice: Subject to any disclaimer, the term of this patent is extended or adjusted under 35 U.S.C. 154(b) by 0 days.

(21) Appl. No.: 15/638,965

(22) Filed: Jun. 30, 2017

(65) Prior Publication Data
US 2018/0011327 A1 Jan. 11, 2018

Related U.S. Application Data

(60) Provisional application No. 62/469,908, filed on Mar. 10, 2017, provisional application No. 62/373,832, filed on Aug. 11, 2016, provisional application No. 62/358,875, filed on Jul. 6, 2016.

(51) Int. Cl.
  *G02B 27/01* (2006.01)
  *G02B 3/08* (2006.01)
(52) U.S. Cl.
  CPC ........... *G02B 27/0176* (2013.01); *G02B 3/08* (2013.01); *G02B 27/0172* (2013.01); *G02B 2027/0152* (2013.01); *G02B 2027/0169* (2013.01)

(58) Field of Classification Search
  CPC ........... G02B 27/0172; G02B 27/0176; G02B 27/01; G02B 27/017; G02B 27/0179; G02B 27/04; G02B 27/0103; G02B 2027/0152; G02B 2027/0169; G02B 2027/0132; G02B 2027/0134; G02B 2027/0143
  USPC .......................... 359/630, 629, 631, 633, 13
  See application file for complete search history.

(56) References Cited

U.S. PATENT DOCUMENTS

| | | | | |
|---|---|---|---|---|
| 6,084,555 | A | * | 7/2000 | Mizoguchi ............... G02B 7/12 345/8 |
| 2014/0152531 | A1 | * | 6/2014 | Murray ................. G02B 27/022 345/8 |
| 2016/0202482 | A1 | * | 7/2016 | Kuzuhara .............. B60K 35/00 359/633 |
| 2016/0349836 | A1 | * | 12/2016 | Goossens ................ G06F 3/011 |
| 2017/0199385 | A1 | * | 7/2017 | Kong .................. G02B 27/0179 |

* cited by examiner

*Primary Examiner* — Travis S Fissel
(74) *Attorney, Agent, or Firm* — Ansel M. Schwartz

(57) ABSTRACT

A head mounted display for a user that uses a display screen to produce images. The head mounted display includes a frame. The frame has a pair of lenses. The pair of lenses has their optical centers biased away from their physical centers. The head mounted display includes a strap which attaches to the frame and fits about the user's head to hold the frame to the user's head. A method for viewing images by a user.

11 Claims, 25 Drawing Sheets

HEAD MOUNTED DISPLAY AND METHOD

CROSS-REFERENCE TO RELATED APPLICATIONS

This is a non-provisional application of U.S. provisional applications 62/358,875 filed Jul. 6, 2016; 62/373,832 filed Aug. 11, 2016; and 62/469,908 filed Mar. 10, 2017, all of which are incorporated by reference herein.

FIELD OF THE INVENTION

The present invention is related to a head mounted display having a pair of lenses through which a user views a display screen held by the head mounted display. (As used herein, references to the "present invention" or "invention" relate to exemplary embodiments and not necessarily to every embodiment encompassed by the appended claims.) More specifically, the present invention is related to a head mounted display having a pair of lenses through which a user views a display screen held by the head mounted display where the pair of lenses have their optical centers biased away from their physical centers.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

With the advent of small display screens, such as those commonly provided by a smart phone, applications have become available to use the small display screens for virtual reality. To better create the virtual reality, these display screens are placed in head mounted displays. The function of the head mounted displays is not only to establish and support the virtual reality generated from the small screens, but to also hold the display screens to a viewer's head so the viewer does not have to hold the display screen with his or her hands.

The experience that the viewer has of the virtual reality provided by the display screens is enhanced by the head of display which holds the display screen being comfortable and providing as realistic a virtual reality as possible. What this means is that the head mounted display should be sturdy but as lightweight as possible so it securely stays on the viewers and does not irritate the skin of the viewer that the head mounted display contacts. In addition, due to how close the display screen is held relative to the eyes of the viewer by the head mounted display, the images put forth by the display screen should not overlap with each other or cause distortion in view by the viewer.

BRIEF SUMMARY OF THE INVENTION

The present invention pertains to a head mounted display for a user that uses a display screen to produce images. The head mounted display comprises a frame. The frame has a first face which holds the display screen, a second face which holds a first reflecting surface; a third face which holds a pair of lenses; a fourth face which holds a second reflecting surface and a fifth face having 2 eyeholes and a nose hole that is positioned on the nose of the user, with the eyeholes aligned with the eye of the user. The light emitted from the display screen is reflected by the first reflecting surface to the pair of lenses, which focuses the light as it passes through the lenses to the second reflecting surface, which reflects the focused light to the eyes of the user through the eyeholes. The pair of lenses has their optical centers biased away from their physical centers. The head mounted display comprises a strap which attaches to the frame and fits about the user's head to hold the frame to the user's head.

The present invention pertains to a head mounted display for a user that uses a display screen to produce images. The head mounted display comprises a frame. The frame has a first face which holds the display screen, a second face which holds a first reflecting surface; a third face which holds a pair of lenses; a fourth face which holds a second reflecting surface and a fifth face having two eyeholes and a nose hole that is positioned on the nose of the user, with the eyeholes aligned with the eye of the user. The light emitted from the display screen is reflected by the first reflecting surface to the pair of lenses, which focuses the light as it passes through the lenses to the second reflecting surface, which reflects the focused light to the eyes of the user through the eyeholes. The pair of lenses always maintain for any field of view two separate non-overlapping images for the user's eyes. The head mounted display comprises a strap which attaches to the frame and fits about the user's head to hold the frame to the user's head.

The present invention pertains to a method for viewing images by a user. The method comprises the steps of placing a head mounted display on a head of the user. The head mounted display has a frame. The frame has a first face which holds a display screen, a second face which holds a first reflecting surface; a third face which holds a pair of lenses; a fourth face which holds a second reflecting surface and a fifth face having two eyeholes and a nose hole that is positioned on the nose of the user, with the eyeholes aligned with the eye of the user. The head mounted display having a strap which attaches to the frame and fits about the user's head to hold the frame to the user's head. There is the step of emitting light from the display screen which is reflected by the first reflecting surface to the pair of lenses, which focuses the light as it passes through the lenses to the second reflecting surface, which reflects the focused light to the eyes of the user through the eyeholes. The pair of lenses always maintains for any field of view two separate non-overlapping images for the user's eyes.

The present invention pertains to a method for viewing images by a user. The method comprises the steps of placing a head mounted display on a head of the user. The head mounted display has a frame. The frame has a first face which holds a display screen, a second face which holds a first reflecting surface; a third face which holds a pair of lenses; a fourth face which holds a second reflecting surface and a fifth face having two eyeholes and a nose hole that is positioned on the nose of the user, with the eyeholes aligned with the eye of the user. The head mounted display having a strap which attaches to the frame and fits about the user's head to hold the frame to the user's head. There is the step of emitting light from the display screen which is reflected by the first reflecting surface to the pair of lenses, which focuses the light as it passes through the lenses to the second reflecting surface, which reflects the focused light to the eyes of the user through the eyeholes. The pair of lenses has their optical centers biased away from their physical centers.

The present invention pertains to a head mounted display for a user that uses a display screen to produce images. The head mounted display comprises a frame. The frame has a first face which holds the display screen, a second face which holds a first reflecting surface; a third face which holds a pair of lenses; a fourth face which holds a second reflecting surface and a fifth face having two eyeholes and a nose hole that is positioned on the nose of the user, with the eyeholes aligned with the eye of the user. The light emitted from the display screen is reflected by the first reflecting surface to the pair of lenses, which focuses the light as it passes through the lenses to the second reflecting surface, which reflects the focused light to the eyes of the user through the eyeholes. The pair of lenses has their optical centers biased away from their physical centers where the first, second, fourth and fifth faces form a parallelogram. The head mounted display comprises a strap which attaches to the frame and fits about the user's head to hold the frame to the user's head.

BRIEF DESCRIPTION OF THE SEVERAL VIEWS OF THE DRAWING

In the accompanying drawings, the preferred embodiment of the invention and preferred methods of practicing the invention are illustrated in which.

DETAILED DESCRIPTION OF THE INVENTION

Figure 1A:
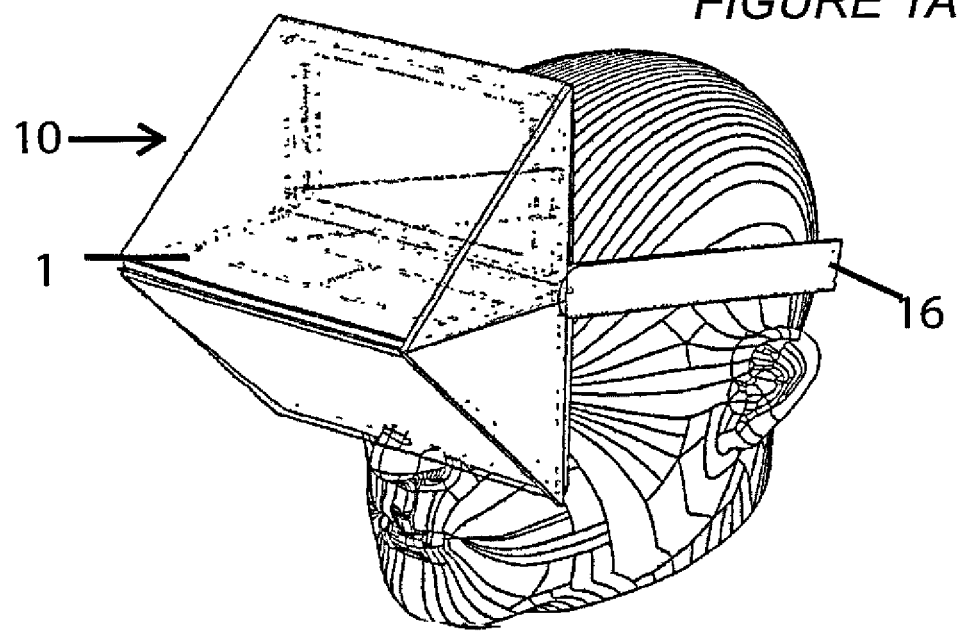
FIG. 1A is a perspective view of the head mounted display of the present invention on a viewer's head.

Referring now to the drawings wherein like reference numerals refer to parts throughout the several views, and more specifically to FIGS. 1A, 1B, 2, 3, 4A, and 4B thereof, there is shown a head mounted display 10 for a user that uses a display screen 1 to produce images. The head mounted display 10 comprises a frame 5. The frame 5 has a first face 12 which holds the display screen 1, a second face 14 which holds a first reflecting surface 2; a third face 16 which holds a pair of lenses 3; a fourth face 18 which holds a second reflecting surface 4 and a fifth face 20 having two eyeholes 22 and a nose hole that is positioned on the nose of the user, with the eyeholes 22 aligned with the eye of the user. The light emitted from the display screen 1 is reflected by the first reflecting surface 2 to the pair of lenses 3, which focuses the light as it passes through the lenses 3 to the second reflecting surface 4, which reflects the focused light to the eyes of the user through the eyeholes 22. The pair of lenses 3 has their optical centers biased away from their physical centers. The head mounted display 10 comprises a strap 6 which attaches to the frame 5 and fits about the user's head to hold the frame 5 to the user's head.

The present invention pertains to a head mounted display 10 for a user that uses a display screen 1 to produce images. The head mounted display 10 comprises a frame 5. The frame 5 has a first face 12 which holds the display screen 1, a second face 14 which holds a first reflecting surface 2; a third face 16 which holds a pair of lenses 3; a fourth face 18 which holds a second reflecting surface 4 and a fifth face 20 having two eyeholes 22 and a nose hole that is positioned on the nose of the user, with the eyeholes 22 aligned with the eye of the user. The light emitted from the display screen 1 is reflected by the first reflecting surface 2 to the pair of lenses 3, which focuses the light as it passes through the lenses 3 to the second reflecting surface 4, which reflects the focused light to the eyes of the user through the eyeholes 22. The pair of lenses 3 always maintain for any field of view two separate non-overlapping images for the user's eyes. The head mounted display 10 comprises a strap 6 which attaches to the frame 5 and fits about the user's head to hold the frame 5 to the user's head.

The present invention pertains to a method for viewing images by a user. The method comprises the steps of placing a head mounted display 10 on a head of the user. The head mounted display 10 has a frame 5. The frame 5 has a first face 12 which holds a display screen 1, a second face 14 which holds a first reflecting surface 2; a third face 16 which holds a pair of lenses 3; a fourth face 18 which holds a second reflecting surface 4 and a fifth face 20 having two eyeholes 22 and a nose hole that is positioned on the nose of the user, with the eyeholes 22 aligned with the eye of the user. The head mounted display 10 having a strap 6 which attaches to the frame 5 and fits about the user's head to hold the frame 5 to the user's head. There is the step of emitting light from the display screen 1 which is reflected by the first reflecting surface 2 to the pair of lenses 3, which focuses the light as it passes through the lenses 3 to the second reflecting surface 4, which reflects the focused light to the eyes of the user through the eyeholes 22. The pair of lenses 3 always maintains for any field of view two separate non-overlapping images for the user's eyes.

The present invention pertains to a method for viewing images by a user. The method comprises the steps of placing a head mounted display 10 on a head of the user. The head mounted display 10 has a frame 5. The frame 5 has a first face 12 which holds a display screen 1, a second face 14 which holds a first reflecting surface 2; a third face 16 which holds a pair of lenses 3; a fourth face 18 which holds a second reflecting surface 4 and a fifth face 20 having two eyeholes 22 and a nose hole that is positioned on the nose of the user, with the eyeholes 22 aligned with the eye of the user. The head mounted display 10 having a strap 6 which attaches to the frame 5 and fits about the user's head to hold the frame 5 to the user's head. There is the step of emitting light from the display screen 1 which is reflected by the first reflecting surface 2 to the pair of lenses 3, which focuses the light as it passes through the lenses 3 to the second reflecting surface 4, which reflects the focused light to the eyes of the user through the eyeholes 22. The pair of lenses 3 has their optical centers biased away from their physical centers.

Figure 15:
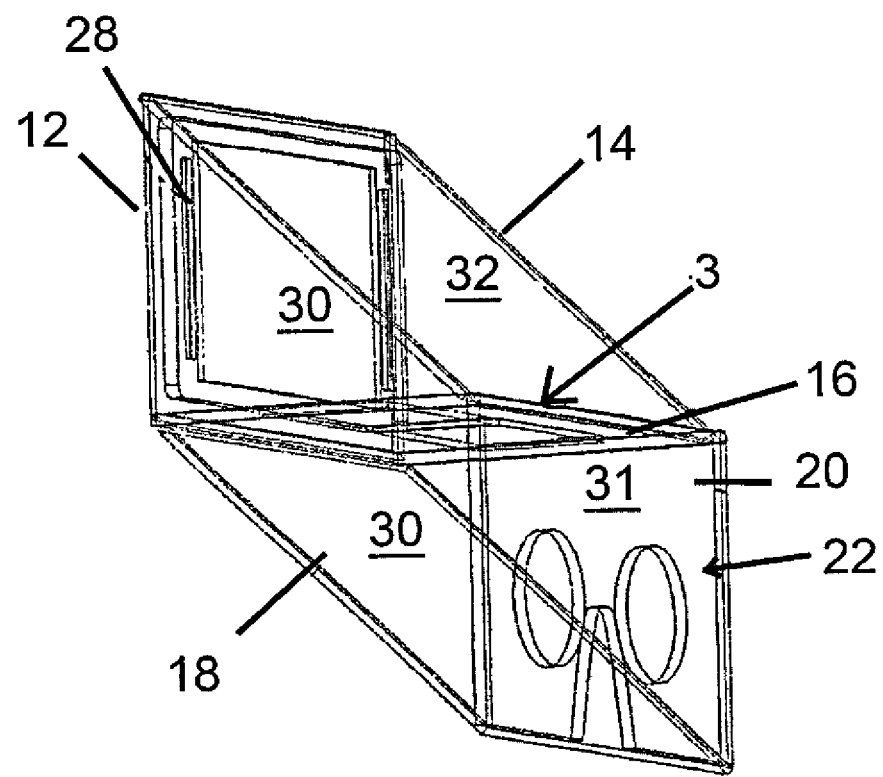
FIG. 15 shows another alternative design for an HMD.

The present invention pertains to a head mounted display 10 for a user that uses a display screen 1 to produce images, as shown in FIG. 15. The head mounted display 10 comprises a frame 5. The frame 5 has a first face 12 which holds the display screen 1, a second face 14 which holds a first reflecting surface 2; a third face 16 which holds a pair of lenses 3; a fourth face 18 which holds a second reflecting surface 4 and a fifth face 20 having two eyeholes 22 and a nose hole that is positioned on the nose of the user, with the eyeholes 22 aligned with the eye of the user. The light emitted from the display screen 1 is reflected by the first reflecting surface 2 to the pair of lenses 3, which focuses the light as it passes through the lenses 3 to the second reflecting surface 4, which reflects the focused light to the eyes of the user through the eyeholes 22. The pair of lenses 3 has their optical centers biased away from their physical centers where the first, second, fourth and fifth faces 12, 14, 18, 20 form a parallelogram. The head mounted display 10 comprises a strap 6 which attaches to the frame 5 and fits about the user's head to hold the frame 5 to the user's head.

In the operation of the invention, FIG. 1 shows a perspective view of an HMD 10 on the head of a user.

Inventory of Some Physical Parts of the HMD 10:
1. A Smartphone or similar device with a display screen
2. A first reflecting surface, which can be a front-surface mirror
3. A pair of lenses, which can be Fresnel lenses or Convex Lenses
4. A second reflecting surface, which can be partially transparent for see-through augmented reality usage or totally reflective for virtual reality usage
5. A frame which holds the first four elements
6. A strap attached to the frame which holds the frame to the head of the user The frame 5 has a first face 12 which receives the phone, a second face 14 that holds the first reflecting surface 2, a third face 16 which holds the pair of lenses 3, a fourth face 18 which holds the second reflecting surface 4 and a fifth face 20 having two eyeholes 22 and a nose hole that fits on the head of the user on the HMD 10. Also, on the left side 30 and right side 32 of the HMD 10 there are opaque walls to block extraneous light from entering the HMD 10 through the sides.

Center-Biased Lens Design for Wide Field of View

In a Head Mounted Display (HMD) 10 for viewing virtual reality (VR) and mixed reality (MR), it is desirable to maximize the Angular Field Of View (AFOV), because a larger AFOV increases the sense of psychological immersion for the user of the HMD 10. Herein, several novel techniques are described for increasing the AFOV of the HMD 10.

If the AFOV is increased beyond a certain point, the two lenses 3 will begin to image overlapping areas on the display screen 1. But for proper stereoscopic viewing, it is necessary for these two display areas to not overlap, because any overlap will cause each eye of the user to see portions of the image that were intended to be seen only by the other eye.

In order to address this limitation, the current invention describes a means to move the respective image areas on the display screen 1 farther apart, without needing to move the lenses 3 farther apart. To do this, the current invention uses lenses 3 whose optical centers are biased away from their physical center, as shown in FIG. 1B.

Figure 1B:
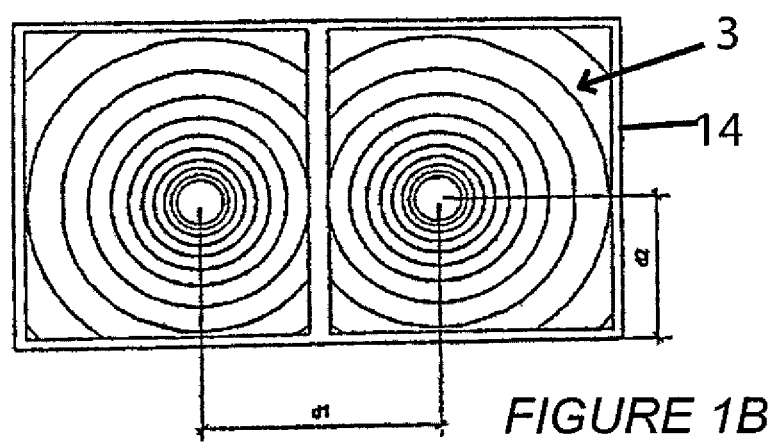
FIG. 1B shows the biased center lens layer.
Figure 2:
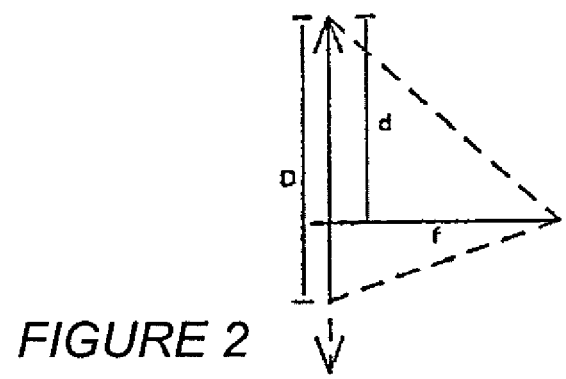
FIG. 2 shows the AFOV of the calculation parameters of the biased-center lens.

FIG. 1B corresponds to part 3 in the HMD 10. In FIG. 1B, the area with circles is the area of lens.

There is one lens for each eye. In FIG. 1B, each lens is represented by a set of concentric circles. In an embodiment using Fresnel lenses, which have a flat form factor, each lens can be attached to the housing of the HMD 10 by being glued in place.

The distance of d1 and d2 represents the physical limitation by users, where d1 is the intraocular distance between the user's two eyes, and d2 is the distance from the user's pupil to the bottom of the user's nose. These two parameters will limit the center point of the lens. The HMD 10 provides some space for the user to relocate the lens.

After relocating the center point of each lens, another feature of the HMD 10 is that the lens shape does not need to be round. Instead it can be rectangular, in one embodiment a Fresnel lens, whose rectangular extent corresponds to the entire region of the mobile phone that is visible from the eye that looks through that lens.

This innovation increases the field of view for any given geometric arrangement. Typically, optical devices tend to use round lenses, which are limited by d1, in order to keep the optic center, geometric center and the gazing point along a common axis. However, since in this design, the geometric center point can be biased, if the AFOV (Angular Field of View) needs to be calculated, proceed as in FIG. 2.

$$AFOV = \tan^{-1}\left(\frac{d}{f}\right) + \tan^{-1}\left(\frac{D-d}{f}\right)$$

where D is the extent of the lens in any given dimension. D can be different in the horizontal and vertical dimension; d is the offset from the lens' edge to the optical center of the lens in that dimension, and the f is the focal length of the lens. The AFOV computation above can be applied to both the horizontal and vertical dimensions of the lens.

In one embodiment, a viewing device can be implemented with a 45/45 degree angular design for a 6 inch mobile phone. For example, assume f=2.3", screen dimensions are 6.23"*2.06", and an intraocular distance of 2.5 inch, then a single eye's AFOV can be calculated as:

$$AFOV_{horizontal} = \tan^{-1}\left(\frac{\frac{6.23-2.5}{2}}{2.3}\right) + \tan^{-1}\left(\frac{\frac{2.5}{2}}{2.3}\right) = 67.7°$$

For two eyes, suppose the small points are merging together in order to create a stereoscope view, then the total horizontal field of view should be described as:

$$AFOV_{horizontal_{doubleEyes}} = 2*\tan^{-1}\left(\frac{\frac{6.23-2.5}{2}}{2.3}\right)+\tan^{-1}\left(\frac{\frac{2.5}{2}}{2.3}\right)=106.9°$$

In this embodiment, the vertical field of view is correspondingly increased to 53 degrees.

Note that the bias-center design is useful because of the limitation that the typical human intraocular distance is around 2.5 inch. Without such a limitation, it would be better to keep the d=D/2 to get the largest AFOV.

Also, in order to maximize AFOV, some significant eye relief distance will typically be required. Because the lenses 3 are not being placed extremely close to the user's eye, the image of the lens will naturally have a 2 inch eye relief distance. This will provide a more comfortable user experience compared with directly putting a short focal length lens extremely near to the user's eye.

Note that the field of view in the above-described embodiment remains limited by the size of the screen of the mobile phone. If the screen can be modified, then theoretically the horizontal field of view can increase to approximately 120 degrees, which approaches the limits of human vision.

Alternative Design to Change the Mirror Angles

Figure 3:
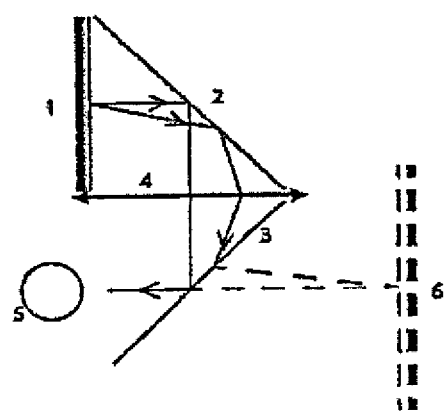
FIG. 3 shows the optical view from the side of the head mounted display.

In the design described in FIG. 3, the optical path corresponds to FIG. 3.

Figure 4A:
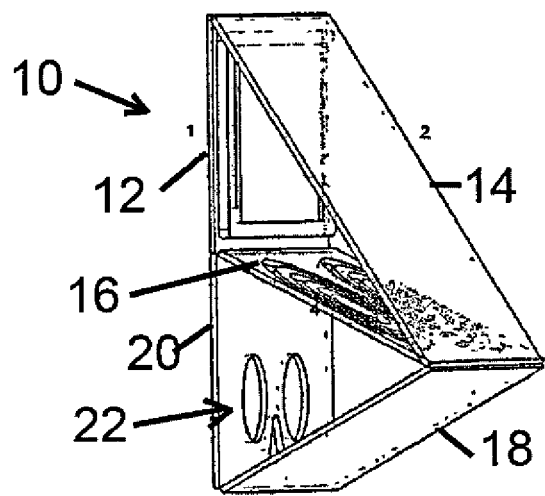
FIG. 4A shows a first alternative angle arrangement design of the head mounted display.
Figure 4B:
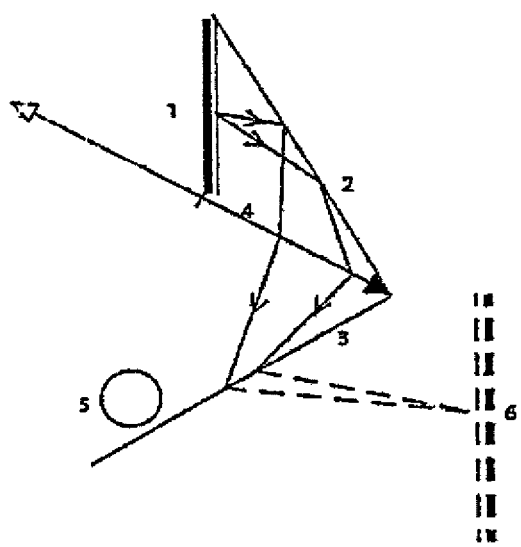
FIG. 4B shows the optical view from the side of the head mounted display shown in FIG. 4A.
Figure 4C:
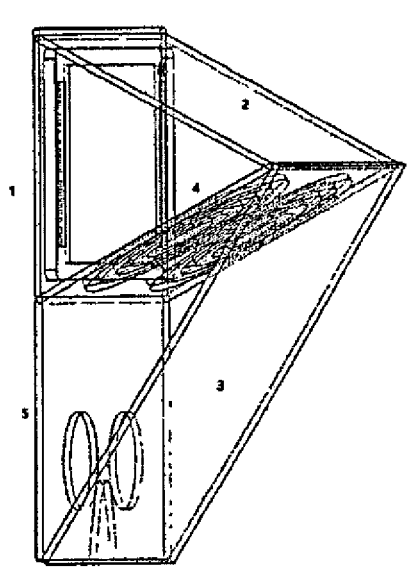
FIG. 4C shows a second alternative angle arrangement design of the head mounted display.
Figure 4D:
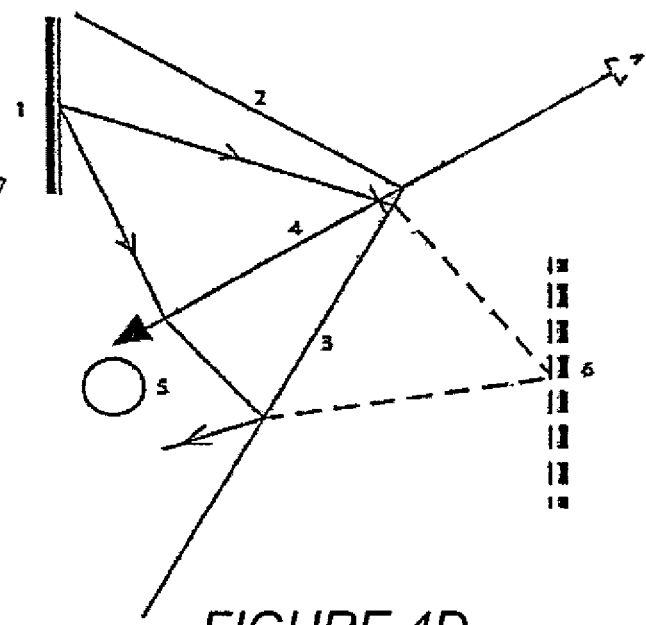
FIG. 4D shows the optical view from the side of the head mounted display shown in FIG. 4C.

FIGS. 4a and 4B show an embodiment in which the layer 2 is 30 degrees from vertical and layer 3 is 60 degrees from vertical. FIGS. 4C and 4D show an embodiment in which layer 2 is 60 degree from vertical and layer 3 is 30 degrees from vertical. By biasing the center of lens to be away from the geometric center point in layer 4, the optic center can still be kept to be on the observer's eye gaze point. The benefits of such a design will be:

1. Decreasing the front-to-back dimension of the entire device. If usage is taken to be of 30/60 or 60/30 design, this dimension will decrease from 2 inch into 1.73 inch.
2. Expanding the vertical field of view. Due to the change in observation angle, the vertical view for this arrangement will be:

$$AFOV_{adjusted}=AFOV_{initial}/\cos(\theta)$$

where the angle θ above is the angle between layer 4 and the horizontal surface in range 0 to 90 degrees.

However, such a design may have some issues, including:
1. The bias-centered design of the lens may influence the initial AFOV, since the majority of lens might not be included in the device, which means only a half lens area to calculate AFOV can be used rather than use an entire one for calculation.
2. From the lens image equation:

$$\frac{1}{u}+\frac{1}{v}=\frac{1}{f}$$

where u and v are the distances from the lens to the objects in focus on either side of the lens, and f is the focal length of the lens.

This arrangement will influence the optical distance from screen to the lens. For the example in FIG. 3, it will lower the object distance, such that a shorter focal length lens can be implemented, and by that method an even larger field of view can be attained. But for the example in FIGS. 4A-4D, since the layer 2 is lifted up, a longer focal length lens is needed to make the image balanced, such that it may decrease the AFOV, even though the FOV has also been increased through the use of a tilted lens layer.

Alternative Design for a Spring-Lock System

Figure 5:
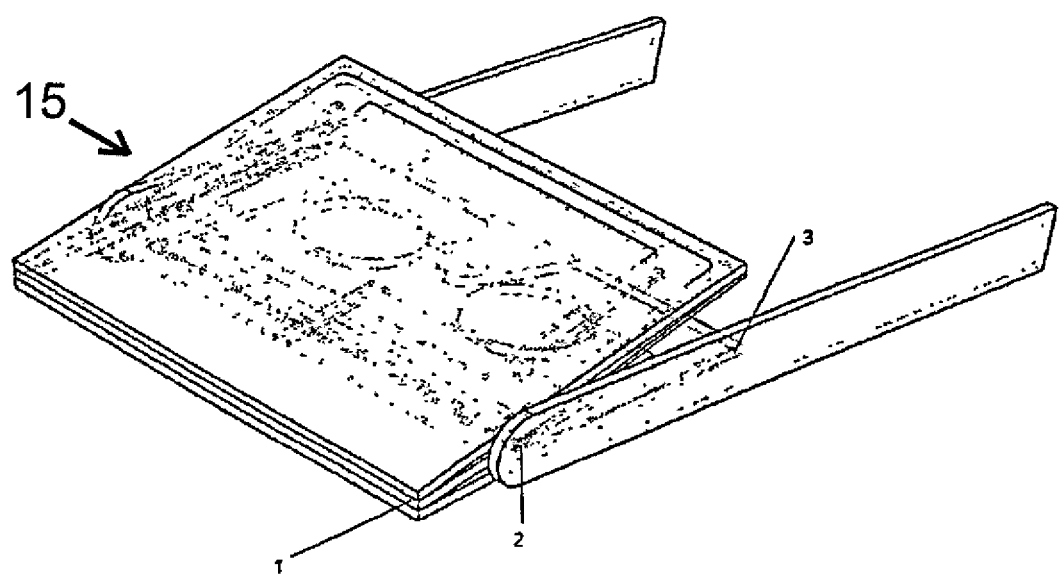
FIG. 5 shows the head mounted display in a folded state.

A fold mechanism which uses a head band to maintain the HMD 10 in its mechanically open state is shown in FIG. 5. To avoid deviation from its fully locked position once it is folded, an alternative folding system based on a spring 24 lock 26, is shown in FIGS. 6A and 6B.

In this alternative design, a spring 24 is added along the guide. The spring 24 fits into the guide extending along the side of face 3, which holds the lenses 3. Point 1 is where the spring 24 is fixed at the beginning point and point 2 is attached to the hinge where the second and fourth face 18s fold flat onto each other. At the end of the spring 24 at point 2, when the second and fourth faces 14, 18 are folded flat in the closed position, the end of the spring 24 fits over the end edge formed by the second and fourth faces 14, 18 folded flat on each other, applying a force to the closed second and fourth faces 14, 18, keeping them in the closed position, and preventing them from sliding or popping open. The spring 24 force is linear from point 1 to point 2, keeping the end of the spring 24 which is positioned about the edge formed by the folded second and fourth faces 14, 18 from moving off this edge and the second and fourth faces 14, 18 opening. Thus when the whole system is folded, it is locked. To use the HMD 10, the user can first pull open the device, and then fix the hinge at point 3. FIG. 6b shows one possible method of locking, which makes use of a curved end to stop the system from opening. As shown in FIG. 6b, the guide in which the spring 24 is disposed has a curved end. When the user wishes to lock the frame 5, the user drags the end 2 of the spring 24 to the end of the curved portion of the slot 28, where the user then latches the open end 2 of the spring 24 to the end or the curved portion. The frame 5 will then be locked because the spring 24 force is tilted, but not directed back towards the beginning of the guide.

Figure 6A:
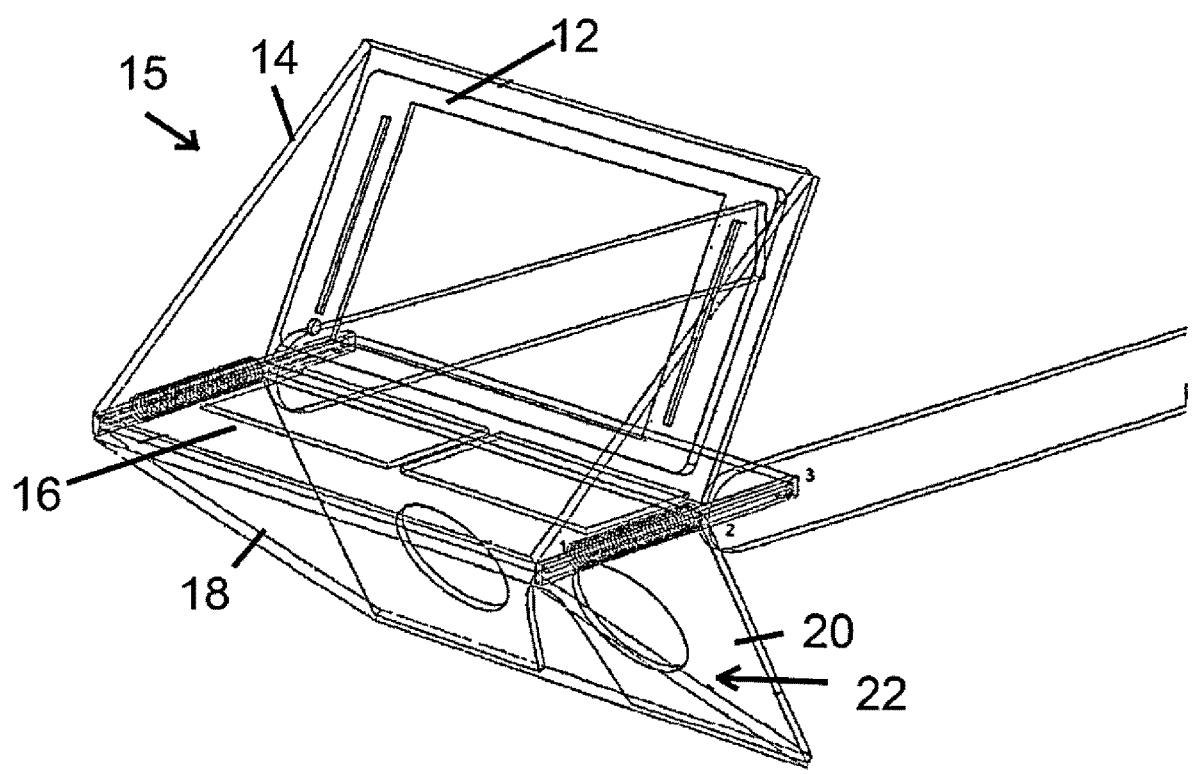
FIG. 6A shows a foldable head mounted display with spring and lock.
Figure 6B:
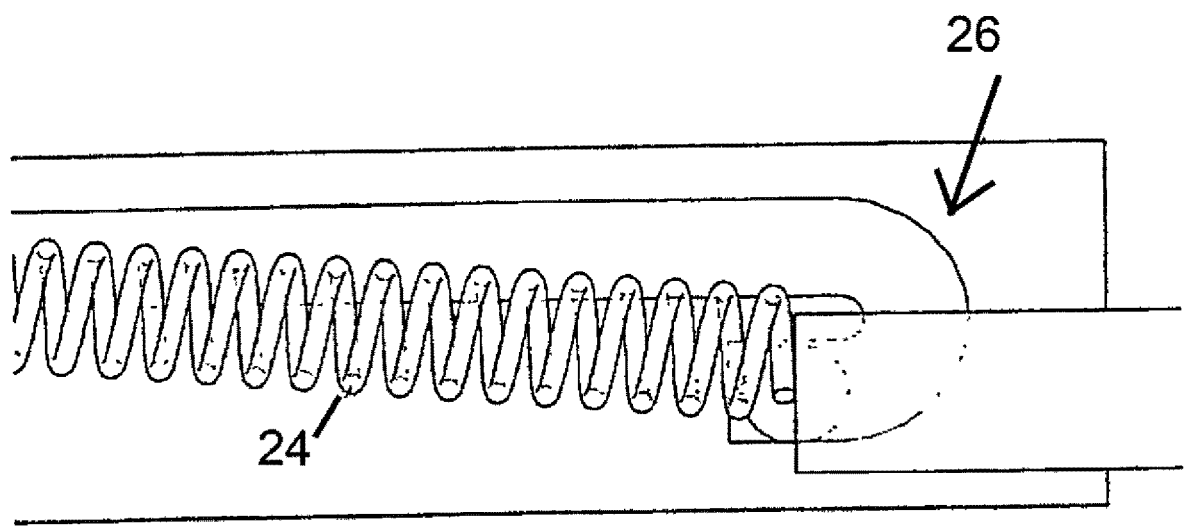
FIG. 6B shows a close up view of the spring and lock of the head mounted display of FIG. 6A.
Figure 7A:
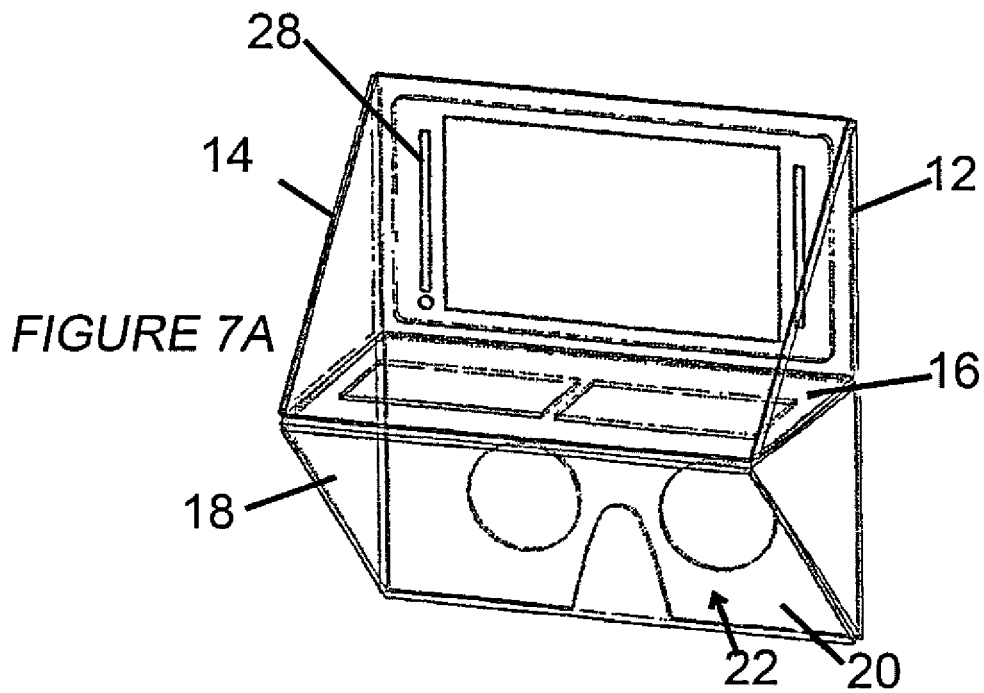
FIGS. 7A-7E show a sequence of images with respect to the process of an HMD being folded.
Figure 7B:
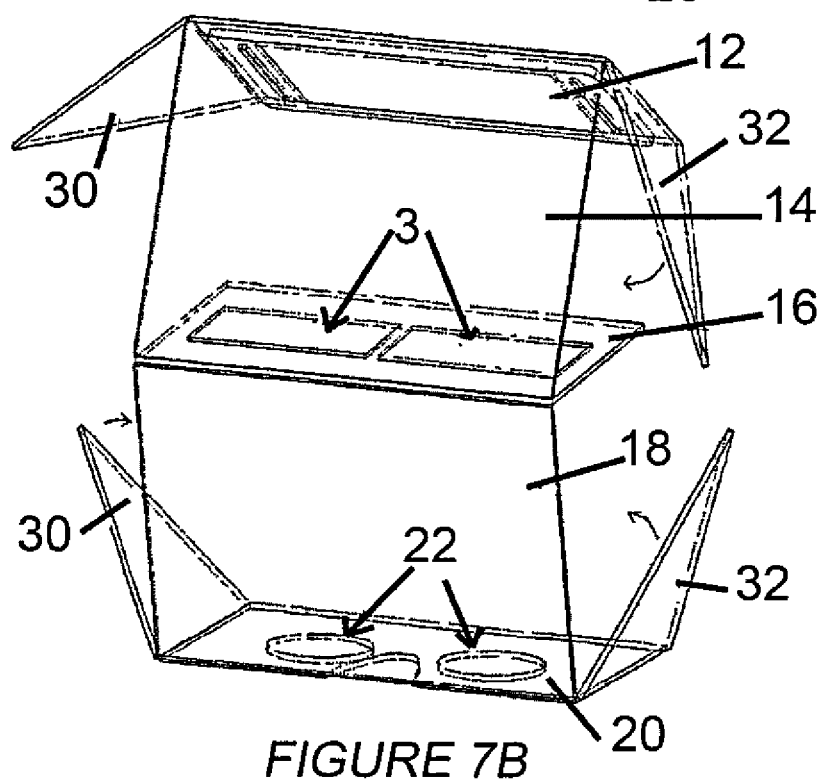
Figure 7C:
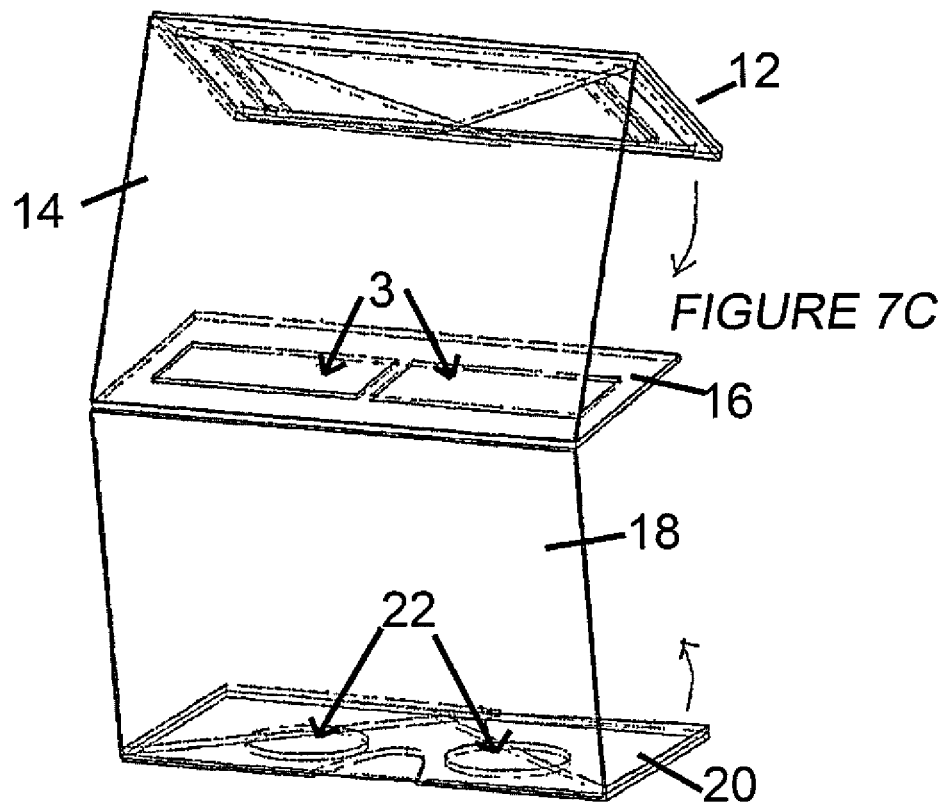
Figure 7D:
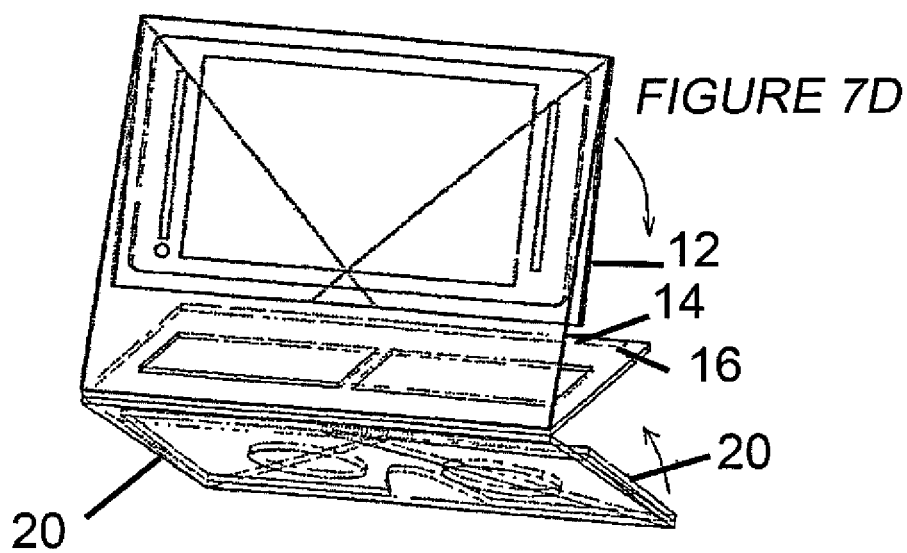
Figure 7E:
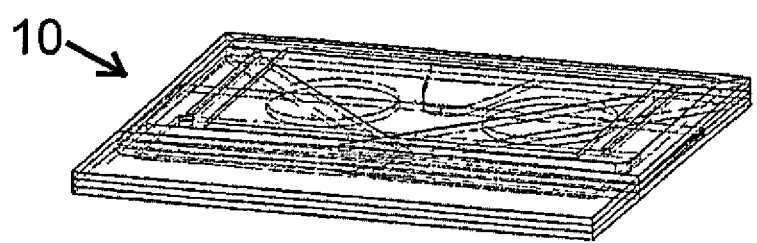

Note that in order to make FIGS. 6A and 6B easier to understand, the side in these figures is omitted. This side is indeed part of the mechanism, and is also foldable as in the embodiment of FIG. 5.

Detailed Design for a Fully Foldable System

A fully foldable structure is shown in FIGS. 7A, 7B, 7C, 7D and 7E, which depict a sequence of images showing the process of an HMD 10 being folded. The side flaps are first folded over onto the second face 14. The faces are then in turn folded onto themselves.

Notice that this folding structure uses two characteristics of the HMD 10:
1. All edges of the system can be rotated, or are able to attach/deattach to the target edge.
2. All faces are fairly thin.

Figure 8A:
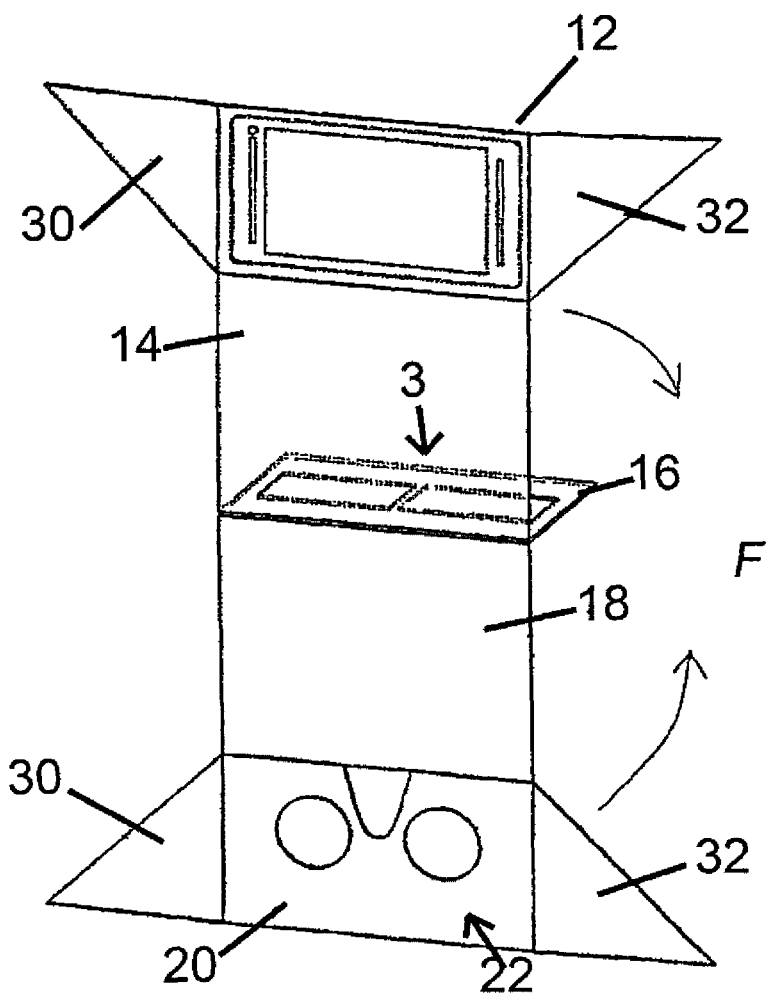
FIGS. 8A-8C show a sequence of figures of a one piece board frame being transformed into the HMD.
Figure 8B:
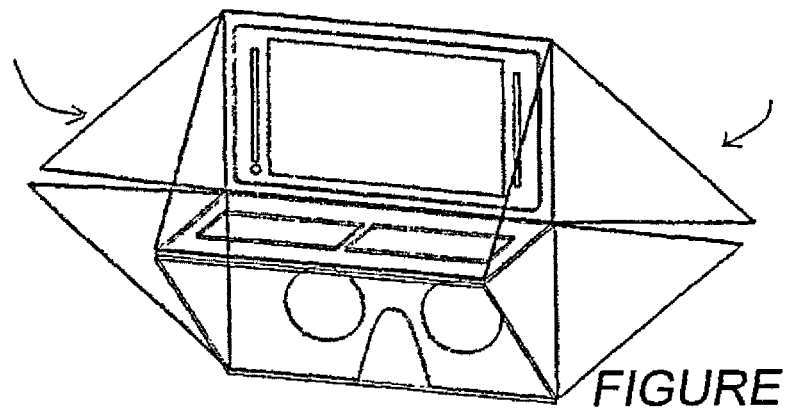
Figure 8C:
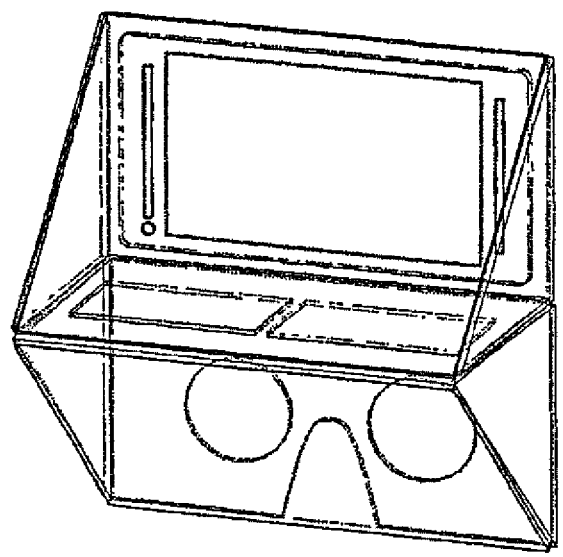

Based on these two characteristics, one possible method to fabricate the device is to use cardboard as the frame 5. Assembly, starting from one piece of cardboard, can then be as shown in FIGS. 8A-8C.

In both of the above implementations, the HMD 10, once opened, can be maintained in its opened state by velcro or by small magnetic clasps.

Also, in both of the above implementations, after the HMD 10 is in its fully open state, the Smartphone or similar display device may be slid into a slot 28 in the frame 5.

Figure 9A:
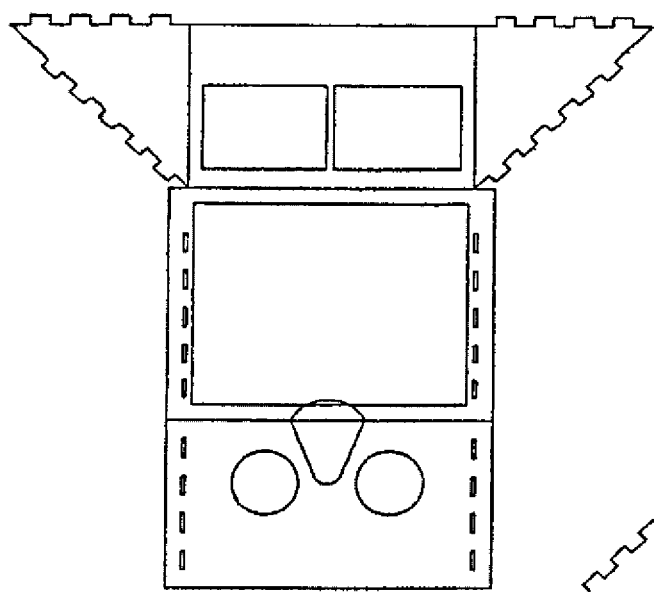
FIG. 9A shows a bottom half of the unassembled cardboard framework.
Figure 9B:
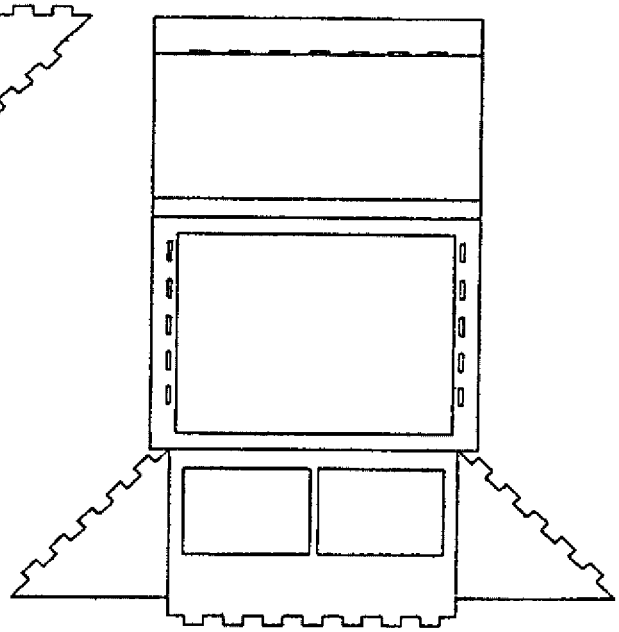
FIG. 9B shows an upper half of the unassembled device of the cardboard framework.

For detailed fabrication steps using cardboard or similar material, one possible method is to begin with two pieces of board as shown in FIGS. 9A and 9B and then glue the lens layers together, making usage of the hinge structures created by the folds in the cardboard. FIG. 9A represents the bottom half of the unassembled, device, while FIG. 9B represents the upper half of the unassembled device.

Linkage Details for Each Components

For the linkage of each surface, there are two kinds of solution.

Figure 10:
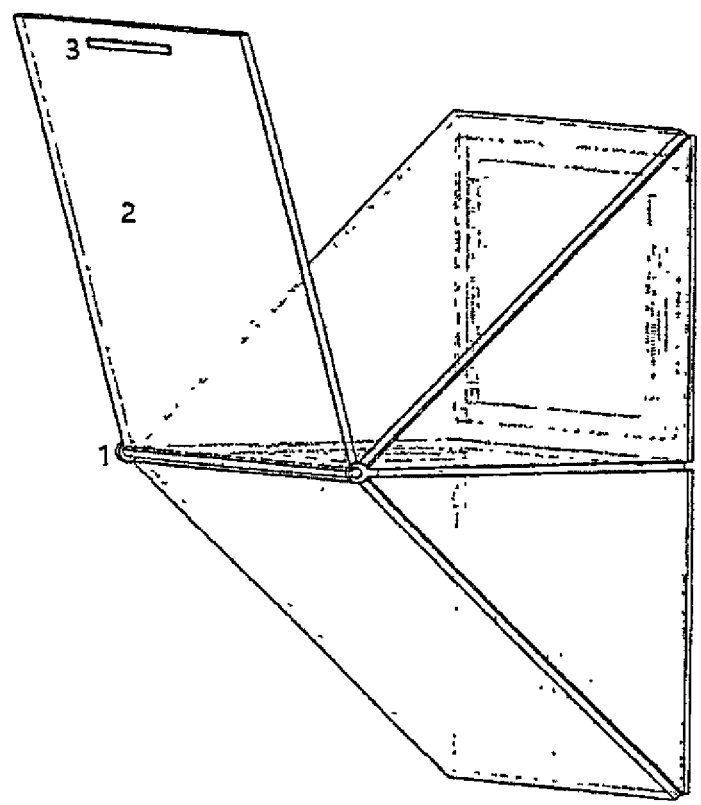
FIG. 10 shows an HMD with a rotatable surface to switch between AR and VR.

The first is a fixed version, in which all components are fixed in place, with an entire fixed frame 5 as mentioned above with put everything attached it. In one embodiment this attachment can be done by gluing. The only component that is not glued into place is the 4th face. In order to switch the use of the HMD 10 between VR and MR, the 4th surface needs to change between fully reflective and partially transparent. In one embodiment, this is done by using a rotatable layer. This layer has a hinge structure to attach between face 2 and face 4, with its rotation axis located to the center line between the 2th and 4th surface, as shown in FIG. 10. Another method is to make face 4 to be replaceable, such that layer 4 can be manually removed and then put back onto main frame 5 by the user, as needed. This can be achieved by using a magnetic structure. FIG. 10 shows one possible method for a rotatable surface to switch between AR and VR. Part 1 is an axis for rotation the layer structure 2, 3 is a magnetic chip to attach this layer into different target area.

Figure 11A:
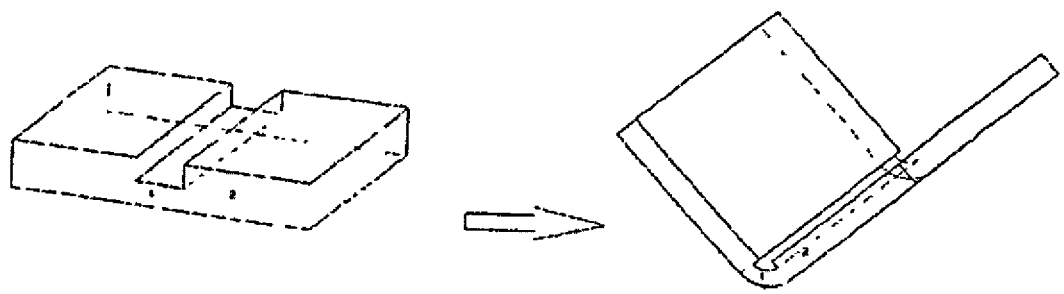
FIG. 11A shows an explicit mechanical hinge.
Figure 11B:
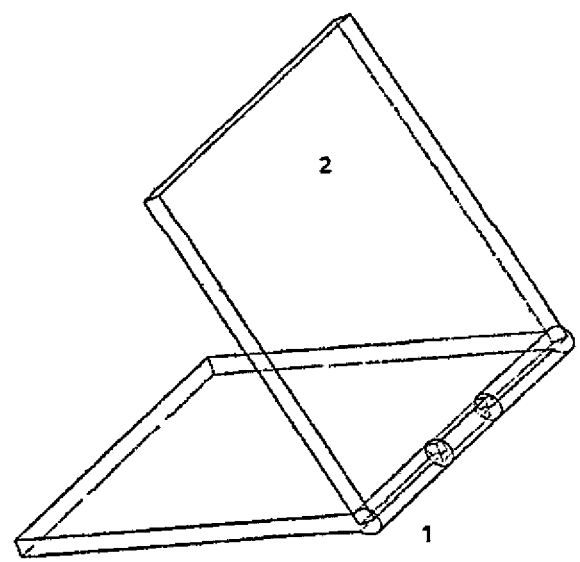
FIG. 11B shows a flexible material which serves as a hinge.

The second version is a foldable version, which makes use of a rotatable hinge between adjoining components of the HMD 10. These hinges can be embodied in several different ways. FIGS. 11A and 11B, and FIG. 11C show two alternative types of hinge—an explicit mechanical hinge or a flexible material. In FIGS. 11A and 11B, the part 1 is thinner and sketchable while link the two layers shows in part 2. In FIG. 11C, the part 1 is a hinge structure that extends from target layers.

Figure 12A:
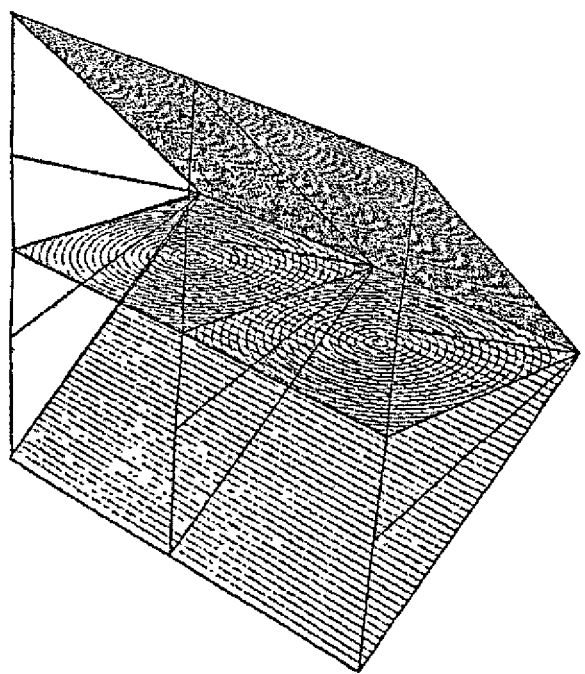
FIGS. 12A and 12B show the foldable side structure using a soft material.
Figure 12B:
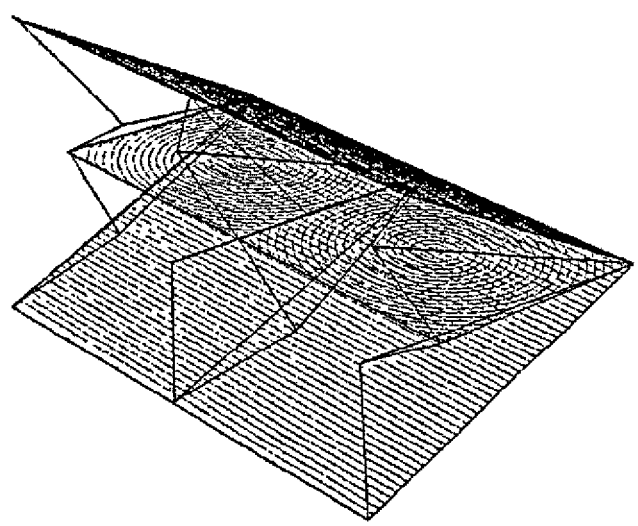
Figure 12C:
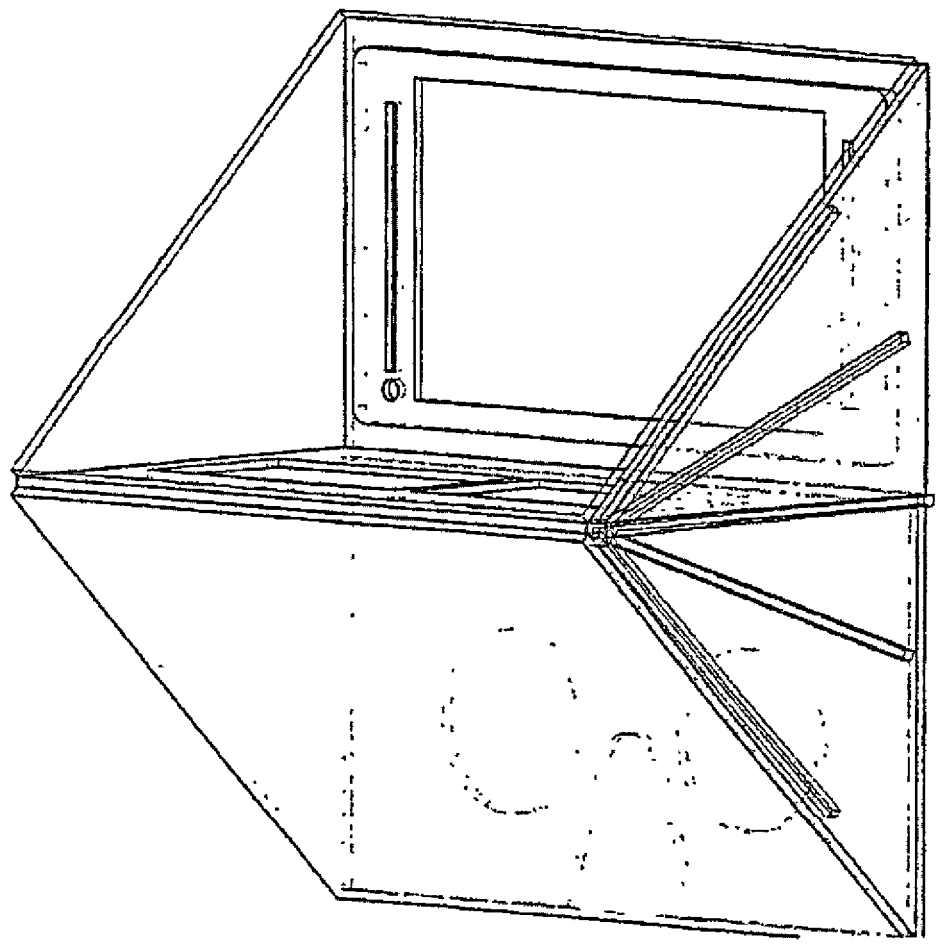
FIG. 12C shows a Chinese fan structure on the side.

Specially, for the parts in the side of the foldable design, rather than using an entire board (as shown in FIG. 7), a structure similar to a Chinese Fan structure can be used, (see FIG. 12A), and the Chinese Fan structure is shown in FIG. 12B, in order to hold the foldable side straight once the HMD 10 is fully opened. Those frames can rotate along the co-axis, and attached to the soft side in 12A, to limit the space the fan takes up while folding. FIG. 12C shows the Chinese Fan Structure on the side.

Methods for Putting the Phone into the Device

Figure 13A:
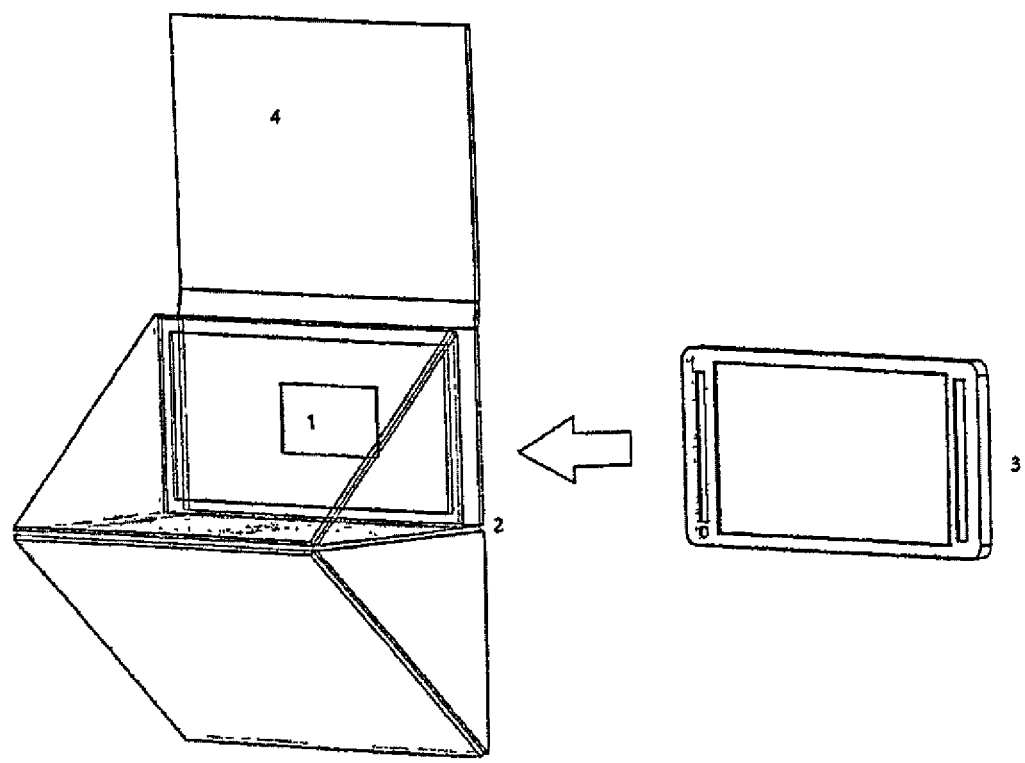
FIGS. 13A-13C show the procedure of putting a mobile phone into the HMD.
Figure 13B:
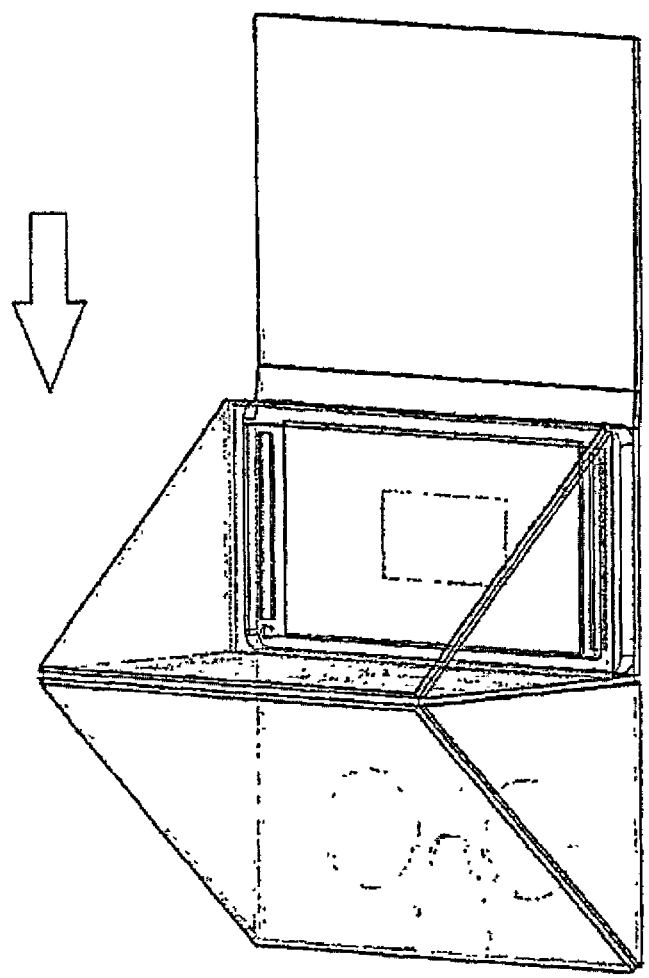
Figure 13C:
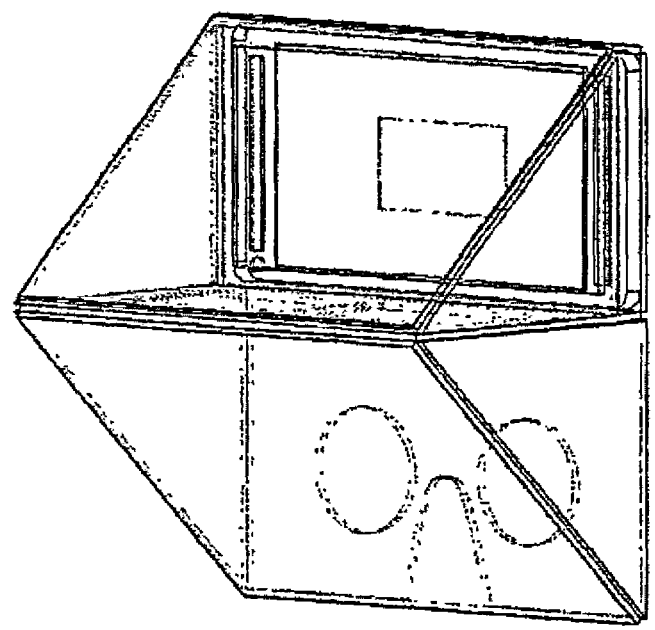
Figure 13D:
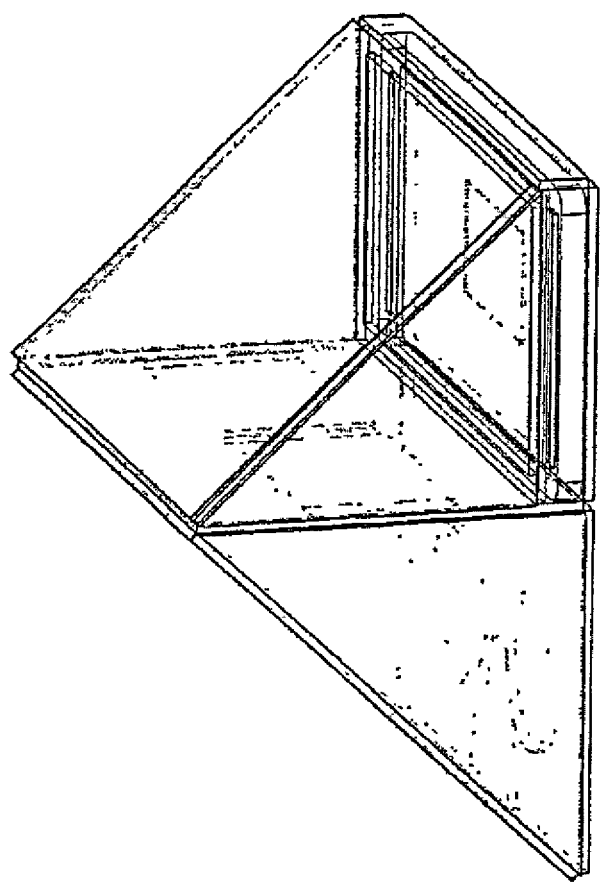
FIG. 13D shows a side view of a slot to keep a phone in the HMD.

The HMD 10 as described contains the capability for putting the mobile phone into the HMD 10 rather than fixing the phone into the HMD 10 as a permanent component of the HMD 10. This is beneficial because is it desirable to be able to use the same HMD 10 with different phones. Two methods are described to put the phone into the HMD 10. FIGS. 13A-13C show the procedure of putting the mobile phone into the HMD 10. FIG. 13D shows the side-view of slot 28 to keep the phone in the HMD 10.

FIGS. 13A-D show how the mobile phone can be inserted into a slot 28 inside the HMD 10. The phone 3 is inserted into the slot 2. Part 1 is a soft stick which both keeps the phone position and also provides the user of the HMD 10 with the ability to adjust the position of the phone. Layer 4 keeps the phone more securely positioned within the HMD 10, so that the phone will not flip out of its slot 28 in the HMD 10.

Figure 14:
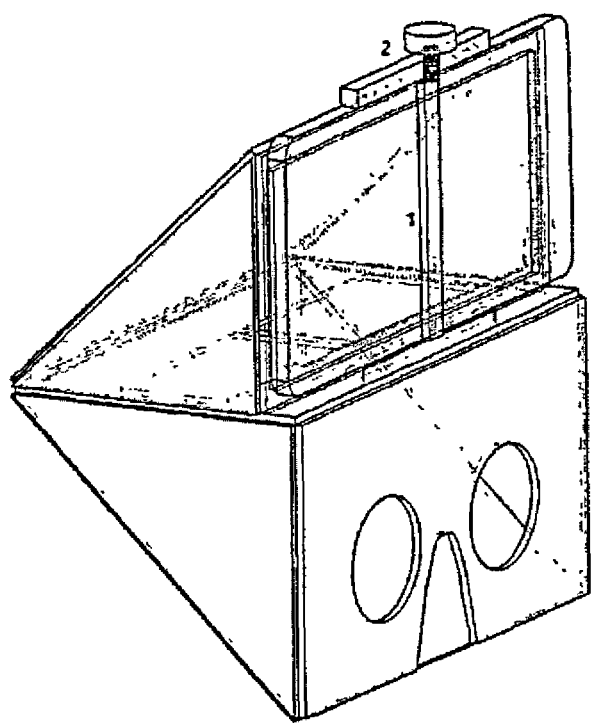
FIG. 14 shows an alternative design to keep a phone in the HMD with a clip.

FIG. 14 is another way to keep the phone located in the desired position, in the form of a screwable clip. The user places the phone into area 1. After the phone is located to the target position, the user screws the screwable clip to tighten it, shown as part 2, thereby securing the phone in place.

Step by Step Operation by User

To the user, the operation is as follows:
1. Look into the viewer.
2. Move head to look in different directions.

Step by Step Internal Operation in Best Embodiment

The internal operation is as follows:
1. Two side-by-side images are generated by the Smartphone to represent a stereo pair
2. The images are reflected off the first reflecting surface 2 and directed toward the lenses 3
3. The images pass through and are focused by the lenses 3
4. The images reflect off the second reflecting surface 4 toward the eyes of the user
5. If the second reflecting surface 4 is semi-transparent, the user can also see directly through it. In this way, the generated image is optically superimposed on reality.

EXAMPLE USE OF INVENTION

An example VR usage involves one or more users looking at a virtual world as a time-varying digitally generated stereo pair. In this usage, the computer within the Smartphone uses the inertial measurement unit (IMU) in the Smartphone to determine direction, and thereby compute the resulting image.

In an example MR usage, more or more users can be looking at the same virtual object, as though that object is floating in the air. If there are two or more users in a room, each user can see the other users as well. Therefore this usage can support the visual illusion that the virtual object is floating in the air between participants in a physical location within the room.

Alternative design to change the phone direction:

In the embodiment described above, the screen of the phone or other display device face away from the user's face, in order to place the weight of the phone as near as possible to the head, and thereby attain better weight balance.

However, for most mobile-phone based VR experiences, the screen of the phone is usually facing toward the user's face. So here is described and shown a parallelogram design variant in which the screen faces toward the user's face, as in FIG. 15.

With this design variant, most of the structure does not change, but the top half of the viewer has been rotated by 180 degrees with respect to the previous design. The benefits of this change are as follows:
1. The design remains foldable, and the field of view remains the same, since this structure is rotate-symmetric in its shape, and therefore both optical path and mechanical properties are equivalent to the previous design;
2. The rear-facing camera on the phone is facing directly out into the world. This makes it easier for the HMD 10 to incorporate information from the outside world and therefore to merge the experience with the real world using inside-out tracking;
3. It is easier to use third-party VR APIs to create content, since this format does not require an adjustment of the IMU coordinate system and graphics coordinate system, since the phone is now positioned in a more standard orientation.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A head mounted display for a user that uses a display screen to produce images comprising:
a frame having a first face which holds the display screen, a second face which holds a first reflecting surface; a third face which holds a pair of lenses; a fourth face which holds a second reflecting surface and a fifth face which is flat having only two eyeholes and a nose hole that is positioned on the nose of the user and is perpendicular to the third face, with the eyeholes aligned with the eye of the user, the light emitted from the display screen is reflected by the first reflecting surface to the pair of lenses, which focuses the light as it passes through the lenses to the second reflecting surface, which reflects the focused light to the eyes of the user through the eyeholes, the pair of lenses have their optical centers biased away from their physical centers, the first face disposed above the fifth face so the display screen is above the user's eyes, the first, second, third, fourth and fifth faces can fold onto themselves into a flat shape, the fourth face directly connected with the fifth face; and
a strap which attaches to the frame and fits about the user's head to hold the frame to the user's head.

2. A head mounted display for a user that uses a display screen to produce images comprising:
a frame having a first face which holds the display screen, a second face which holds a first reflecting surface; a third face which holds a pair of lenses; a fourth face which holds a second reflecting surface and a fifth face which is flat having only two eyeholes and a nose hole that is positioned on the nose of the user and is perpendicular to the third face, with the eyeholes aligned with eyes of the user, the light emitted from the display screen is reflected by the first reflecting surface to the pair of lenses, which focuses the light as it passes through the lenses to the second reflecting surface, which reflects the focused light to the eyes of the user through the eyeholes, the pair of lenses always maintain for any field of view two separate non-overlapping images for the user's eyes, the first face disposed above the fifth face so the display screen is above the user's eyes, the first, second, third, fourth and fifth faces can fold onto themselves into a flat shape, the fourth face directly connected with the fifth face; and
a strap which attaches to the frame and fits about the user's head to hold the frame to the user's head.

3. A method for viewing images by a user comprising the steps of:
placing a head mounted display on a head of the user, the head mounted display having a frame having a first face which holds a display screen, a second face which holds a first reflecting surface; a third face which holds a pair of lenses; a fourth face which holds a second reflecting surface and a fifth face which is flat having only two eyeholes and a nose hole that is positioned on the nose of the user and is perpendicular to the third face, with the eyeholes aligned with the eye of the user, the head mounted display having a strap which attaches to the frame and fits about the user's head to hold the frame to the user's head, the first face disposed above the fifth face so the display screen is above the user's eyes, the first, second, third, fourth and fifth faces can fold onto themselves into a flat shape, the fourth face directly connected with the fifth face; and
emitting light from the display screen which is reflected by the first reflecting surface to the pair of lenses, which Focuses the light as it passes through the lenses to the second reflecting surface, which reflects the focused light to the eyes of the user through the eyeholes, the pair of lenses always maintains for any field of view two separate non-overlapping images for the user's eyes.

4. A method for viewing images by a user comprising the steps of:
placing a head mounted display on a head of the user, the head mounted display having a frame having a first face which holds a display screen, a second face which holds a first reflecting surface; a third face which holds a pair of lenses; a fourth face which holds a second reflecting surface and a fifth face which is flat having only two eyeholes and a nose hole that is positioned on the nose of the user and is perpendicular to the third face, with the eyeholes aligned with the eye of the user, the head mounted display having a strap which attaches to the frame and fits about the user's head to hold the frame to the user's head, the first face disposed above the fifth face so the display screen is above the user's eyes, the first, second, third, fourth and fifth faces can fold onto themselves into a flat shape, the fourth face directly connected with the fifth face; and
emitting light from the display screen which is reflected by the first reflecting surface to the pair of lenses, which focuses the light as it passes through the lenses to the second reflecting surface, which reflects the focused light to the eyes of the user through the eyeholes, the pair of lenses have their optical centers biased away from their physical centers.

5. A head mounted display for a user that uses a display screen to produce images comprising:
a frame having a first face which holds the display screen, a second face which holds a first reflecting surface; a third face which holds a pair of lenses; a fourth face which holds a second reflecting surface and a fifth face which is flat having only two eyeholes and a nose hole that is positioned on the nose of the user and is perpendicular to the third face, with the eyeholes aligned with the eye of the user, the light emitted from the display screen is reflected by the first reflecting surface to the pair of lenses, which focuses the light as it passes through the lenses to the second reflecting surface, which reflects the focused light to the eyes of the user through the eyeholes, the pair of lenses have their optical centers biased away from their physical centers where the first, second, fourth and fifth faces form a parallelogram, the first face disposed above the fifth face so the display screen is above the user's eyes, the first, second, third, fourth and fifth faces can fold onto themselves into a flat shape, the fourth face directly connected with the fifth face; and
a strap which attaches to the frame and fits about the user's head to hold the frame to the user's head.

6. The head mounted display of claim 1 wherein the frame is made of cardboard.

7. The head mounted display of claim 5 including left and right sides which are opaque walls to block extraneous light from entering the HMD through the sides.

8. The head mounted display of claim 7 wherein the first through five faces have rectangular shape.

9. The head mounted display of claim 8 wherein the first face has a slot in which the display screen is disposed.

10. The head mounted display of claim 9 wherein the first face is in space relation with the fifth face and disposed above the third face with the fifth face disposed below the third face.

11. The head mounted display of claim 10 wherein the frame is made of cardboard.

* * * * *